US010214881B2

(12) United States Patent
Pieczynski, II et al.

(10) Patent No.: US 10,214,881 B2
(45) Date of Patent: Feb. 26, 2019

(54) WATER LOSS DETECTION AND CONTROL SYSTEM

(71) Applicant: Flow Stop, LLC, Muenster, TX (US)

(72) Inventors: Joseph W. Pieczynski, II, Liberty Hill, TX (US); Miles Moore, Moran, TX (US); Jeb Stuart Hudson, Eastland, TX (US)

(73) Assignee: Flow Stop, LLC, Muenster, TX (US)

( * ) Notice: Subject to any disclaimer, the term of this patent is extended or adjusted under 35 U.S.C. 154(b) by 0 days.

(21) Appl. No.: 15/882,848

(22) Filed: Jan. 29, 2018

(65) Prior Publication Data

US 2018/0230680 A1 Aug. 16, 2018

Related U.S. Application Data

(60) Provisional application No. 62/457,673, filed on Feb. 10, 2017.

(51) Int. Cl.
*F16K 31/10* (2006.01)
*E03B 7/07* (2006.01)
*F16K 17/20* (2006.01)
*F16K 31/00* (2006.01)
F16K 1/38 (2006.01)
F16K 31/06 (2006.01)

(52) U.S. Cl.
CPC .............. *E03B 7/071* (2013.01); *E03B 7/072* (2013.01); *E03B 7/075* (2013.01); *E03B 7/078* (2013.01); *F16K 17/20* (2013.01); *F16K 31/003* (2013.01); *F16K 31/10* (2013.01); *F16K 1/38* (2013.01); *F16K 31/0658* (2013.01); *Y10T 137/7727* (2015.04); *Y10T 137/7732* (2015.04); *Y10T 137/7761* (2015.04)

(58) Field of Classification Search
CPC .... F16K 31/10; F16K 31/003; F16K 31/0658; F16K 1/38; F16K 17/32; F16K 17/20; E03B 7/071; E03B 7/075; E03B 7/072; E03B 7/078; G01F 1/115; G01F 1/003; G01F 1/005; G01M 3/2807; Y10T 137/7727; Y10T 137/7732; Y10T 137/7761
USPC ........... 251/129.04, 68; 137/464–465, 487.5, 137/459–460; 340/605–606, 609
See application file for complete search history.

(56) References Cited

U.S. PATENT DOCUMENTS

| 4,069,425 A | 1/1978 | Cushing |
| 4,705,060 A * | 11/1987 | Goulbourne ............... F17D 5/02 137/460 |
| 5,568,825 A | 10/1996 | Faulk |

(Continued)

FOREIGN PATENT DOCUMENTS

GB 2521018 A 6/2015

OTHER PUBLICATIONS

CIPO Office Action dated Oct. 16, 2018 gor co-pending Canadian counterpart application No. 2,994,117.

*Primary Examiner* — John Bastianelli
(74) *Attorney, Agent, or Firm* — Elizabeth R. Hall & Associates, PC; Elizabeth R. Hall

(57) ABSTRACT

A device for detecting water loss and consumption from commercial and residential commodes is provided. The device includes a water flow sensor and a shut-off assembly. The device has a controller that receives input from the flow sensor and sends a signal to the shut-off assembly whenever excess water flow is detected.

16 Claims, 7 Drawing Sheets

(56) References Cited

U.S. PATENT DOCUMENTS

| | | | | |
|---|---|---|---|---|
| 5,782,263 A | * | 7/1998 | Isaacson, Jr. | F16K 17/20 137/459 |
| 5,950,667 A | * | 9/1999 | Nicewonger | B23K 11/36 73/861.77 |
| 5,971,011 A | | 10/1999 | Price | |
| 5,979,493 A | * | 11/1999 | Simpkins, Jr. | F16K 17/20 137/624.11 |
| 6,119,720 A | * | 9/2000 | Isaacson, Jr. | F16K 17/20 137/459 |
| 6,708,722 B1 | | 3/2004 | Goodenough | |
| 6,837,271 B1 | * | 1/2005 | Saint | G01M 3/2807 137/460 |
| 6,934,976 B2 | | 8/2005 | Parsons et al. | |
| 7,000,627 B1 | | 2/2006 | Johnson | |
| 7,451,777 B2 | | 11/2008 | Burlage et al. | |
| 7,640,944 B2 | * | 1/2010 | Zakai | G01F 1/26 137/540 |
| 7,994,927 B2 | * | 8/2011 | Atassi | G01F 15/001 340/609 |
| 8,776,827 B2 | * | 7/2014 | Mao | E03B 7/071 137/460 |
| 9,303,782 B2 | | 4/2016 | Stoltz et al. | |
| 9,410,636 B2 | | 8/2016 | Older | |
| 2010/0212748 A1 | | 8/2010 | Davidoff | |
| 2010/0258204 A1 | * | 10/2010 | Cipolla | E03B 7/071 137/460 |

\* cited by examiner

WATER LOSS DETECTION AND CONTROL SYSTEM

CROSS-REFERENCE TO RELATED APPLICATIONS

The present application claims priority under 35 U.S.C. 119(e) to U.S. Provisional Application 62/457,673, filed Feb. 10, 2017, which is hereby incorporated by reference in its entirety.

BACKGROUND OF THE INVENTION

Field of the Invention

The present invention relates to devices and methods for detecting water loss and consumption. In particular, the invention relates to water flow control devices having a flow sensor assembly, a shut-off assembly and a controller in communication with the flow sensor assembly and the shut-off assembly for reducing water loss and over consumption of water from commercial and residential toilet systems.

Description of the Related Art

Currently, commercial and residential commodes suffer from leaks due to worn or stuck flapper valves and defective fill valves which cause unnecessary water loss, water consumption, and flooding. While some devices are known which detect and shut-off water to entire buildings, for example, existing systems fail to provide detection of such water loss at the commode. Many conventional devices primarily address flood prevention by shutting off the water flow after moisture or water is detected in areas where it is not normally present. Most of these flood control devices utilize wall mounted transformers as a power source for small servo motor driven ball valves. The majority of these devices are intended to activate only when a flood is detected and do not, or cannot, detect water being wasted by flowing down the overflow tube, or out through the commode bowl. The available systems and devices use water activated sensors placed inside the commode bowl, or strip type sensors that are placed in close proximity to appliances such as water heaters, dishwashers, washing machines, water softeners, under-sink areas, and commodes. Whole house units also exist that detect constant running water and shutoff the supply to the entire house when a constant flow is detected. These conventional systems can be beneficial for applications like summer homes or homes where the occupants travel for long periods of time, leaving the house empty. Although whole house units will detect leaky flappers, they do not immediately identify and isolate the source of the leak. Accordingly, there is a need for a device that can only shut down water to a leak at a commode, or other appliance, without cutting off water supply to other areas of a house or other unit.

SUMMARY OF THE INVENTION

The present invention relates to devices and methods for detecting water loss and consumption. In particular, the invention relates to water flow control devices having a flow sensor assembly, a shut-off assembly and a controller in communication with the flow sensor assembly and the shut-off assembly for reducing water loss and over consumption of water from commercial and residential water use systems such as toilets.

The present invention involves devices and methods for detecting water loss and consumption from commercial and residential water use systems. In one aspect, the device includes a water inlet; a flow sensor assembly, wherein the inlet is in fluid communication with the flow sensor assembly; a shut-off assembly, wherein the shut-off assembly is located downstream of and in fluid communication with the flow sensor assembly; a controller configured to receive input from the flow sensor assembly, compare the received input to predetermined limits, and to send a signal to the shut-off assembly whenever the received input falls outside of the predetermined limits; and a water outlet, wherein the outlet is located downstream of and in fluid communication with the shut-off assembly.

In one aspect, the flow sensor assembly is configured to send pulse signals to the controller. In one embodiment, the controller is configured to determine the number of pulses from the flow sensor and activate the shut-off assembly if the number of pulses exceeds a given or predetermined count over a pre-set period of time.

In another aspect, the shut-off assembly includes a solenoid. The solenoid can communicate with retainer arms which interface with retainer balls during normal operation. The retainer balls, during normal operation, interface with a radial undercut of a valve stem, wherein the valve stem is positioned perpendicular to a shaft of the solenoid. In one embodiment the solenoid shaft can include a trigger cone having an arcuate surface which engages and conforms with arcuate surfaces of the retainer arms when the solenoid has been activated by the controller.

In another embodiment, a commode water flow control device comprising: a water inlet; a flow sensor assembly in fluid communication with the inlet, wherein the flow sensor assembly includes a flow sensing impeller that rotates as flowing water passes through the flow sensor assembly, wherein the impeller houses a pair of magnets that generate an electronic pulse as the magnets pass a magnetic sensor; a shut-off assembly, wherein the shut-off assembly is located downstream of and in fluid communication with the flow sensor assembly; a controller configured to continually receive the pulses from the flow sensor assembly and to activate the shut-off assembly if a number of pulses exceeds a set count and/or if the pulses continue beyond a set period of; and a water outlet, wherein the outlet is located downstream of and in fluid communication with the shut-off assembly.

In yet another embodiment, the water flow control device can include an integral shut-off collar at one end of the valve stem, such that, when the valve stem lifts to the shut-off position, the shut-off collar seats against the valve seat at the lower end of the valve cage to stop water flow. The valve cage includes an inner bore having a series of cross holes for water flow. The water flow control device can employ O-Rings within the bore of the valve cage to seal the device.

In one embodiment, fluid flowing through the water flow control device is configured to flow from an inlet, through the flow sensor, through the valve cage, and out through openings in the valve cage to exit out an outlet. The water flow control device can be powered by an onboard battery or other means to supply power to the controller.

BRIEF DESCRIPTION OF THE DRAWINGS

Appended FIGS. 1-6 depict certain non-limiting embodiments of the water flow control device and methods of detecting water loss and consumption from water use systems such as commodes. The figures are not intended to limit the scope of the invention but, instead, are intended to provide depictions of specific embodiments, features and non-limiting characteristics of the water flow control device described herein. The accompanying figures further illustrate the present invention. The components of an embodiment shown in the drawings are not necessarily drawn to scale, emphasis instead being placed upon clearly illustrating the principles of the present invention.

FIG. 1 illustrates a perspective view of a back side of a water flow control device in accordance with an embodiment.

FIG. 2 illustrates a perspective view of a front side of the water flow control device in accordance with an embodiment.

FIG. 3 illustrates a cross-sectional side view of the water flow control in accordance an embodiment.

FIG. 4 illustrates a cross sectional view of the flow sensing impeller of the flow sensor assembly in accordance with an embodiment.

FIG. 6 illustrates a cross sectional top view of a valve activation solenoid assembly of the water flow control device in accordance with an embodiment.

DESCRIPTION OF THE PREFERRED EMBODIMENTS

The present invention provides a device for detecting water leaks and water overages in commercial and residential water use systems. In accordance with an embodiment, the device comprises a flow sensor assembly, a shut-off assembly and a controller in communication with the flow sensor assembly and the shut-off assembly for controlling undesired excess water flow.

As an example, a water flow control device for controlling undesired water flow at a toilet is ideally placed or positioned immediately at the commode, between a water outlet from piping that connects the commode to the main water supply. More specifically, the water flow control device is configured to be inserted in the piping between the wall and the commode irrespective of whether a manual shut-off valve next to the wall is connected to the piping.

Figure 1:
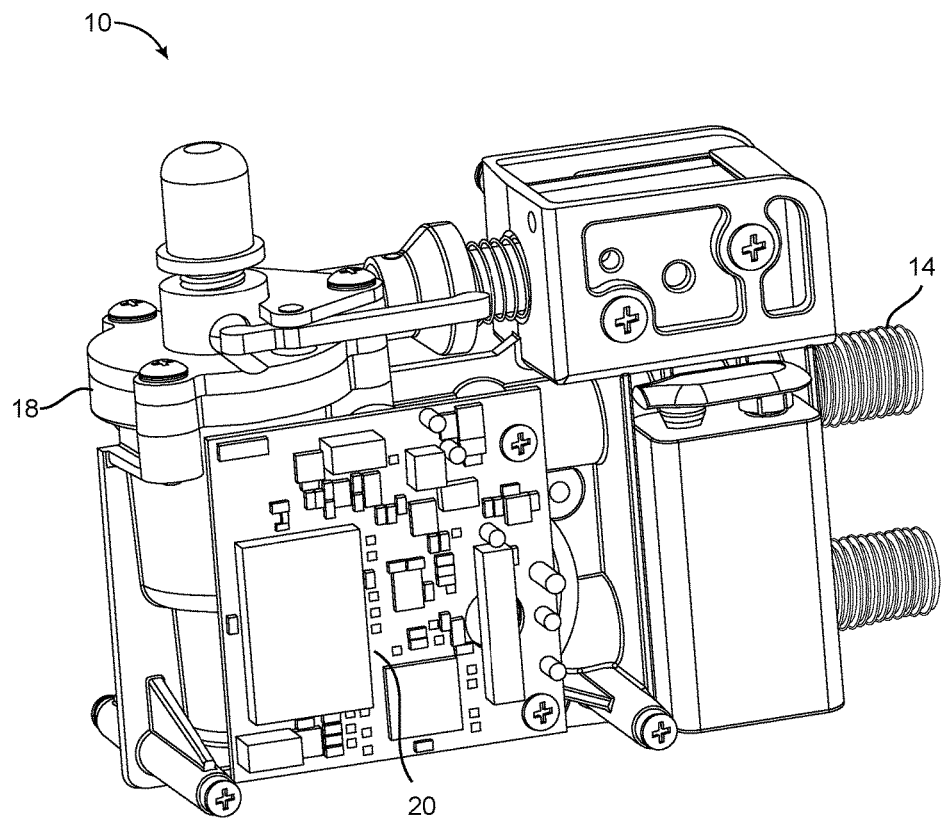
Figure 2:
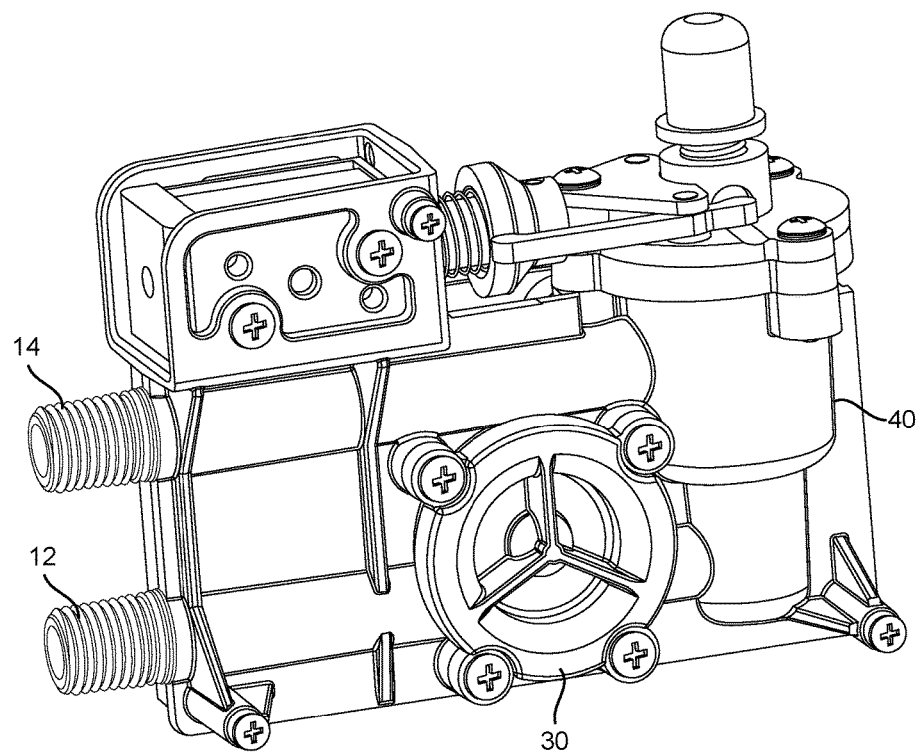

An embodiment of the water flow control device 10 is illustrated in FIGS. 1-6. FIGS. 1-2 illustrate the overall configuration of the general components of one embodiment of the water flow control device 10 described herein. The water flow control device 10 includes an inlet 12, an outlet 14, a flow sensor assembly 30, a shut-off assembly 40 having a shut-off valve 50 and a valve activation solenoid 60, and a controller 20. The controller is configured to receive input from the flow sensor assembly, to evaluate and record the received input, and to send an activation signal to the shut-off assembly if the evaluated input falls outside of predetermined limits. The components of the water flow control device can be made of any suitable material, such as, a plastic material or a noncorrosive metal.

The water flow control device 10 includes an inlet 12. The term "inlet" includes, without limitation, an input member, input port, and the like. The inlet 12 can be threaded and configurable using commercially available pipe fittings such as collars, ninety degree elbows and straight, zero-degree fittings. The configurable inlet 12 connects to water piping (not shown) stemming from a building/structural wall. The water flow control device 10 also includes an outlet 14. The term "outlet" includes, without limitation, an outlet member, outlet port, and the like. The outlet 14 can also be threaded and configurable. The configurable outlet 14 can include a threaded feature to connect to the line from the commode. In one aspect, the threaded outlet 14 can be configurable in the same manner as the configurable inlet 12 and can be identical to the configurable inlet 12. Alternately, the inlet 12 and the outlet 14 can have different configurations. The configurable outlet 14 can be the same size or different from the configurable inlet 12, depending on the size of the conduit from the wall and the piping which connects to the commode. In general, water enters the water flow control device 10 through the configurable inlet 12 and exits via configurable outlet 14.

In one embodiment, the openings of the inlet and outlet 12 and 14 can be oriented in opposing directions from each other (not shown). For example, the inlet 12 may be oriented upward while the outlet 14 may be downward oriented. It is understood, however, that other possible combinations are also envisioned and encompassed within the scope of the present disclosure. It should be appreciated that the water flow control device 10 can be installed inline of the pipe conduit from the wall to the commode and the water flow control device 10 can be at any angle relative to the ground. Hence, the inlet 12 and outlet 14 can be at any angle, and can be pointed upward, downward or sideways during use.

Typically the water flow control device 10 is installed in the piping between a wall and a commode. When the valve in the device is in the open position, water will enter the device through the inlet 12, pass through the flow sensor assembly 30, through the valve 50 in the shut-off assembly 40 and out through the outlet 14 as shown in FIG. 3.

Flow Sensor Assembly

The water flow control device 10 includes a flow sensor assembly 30. The flow sensor assembly can include a rotating component, such as a flow sensing impeller 32. As water flows from the inlet 12 through the flow sensor assembly, the flowing water turns the impeller 32 about an impeller axis 34. The volume of water flowing through the flow sensor assembly that is necessary to rotate the impeller is determined and programmed into the controller 20 software.

Figure 3:
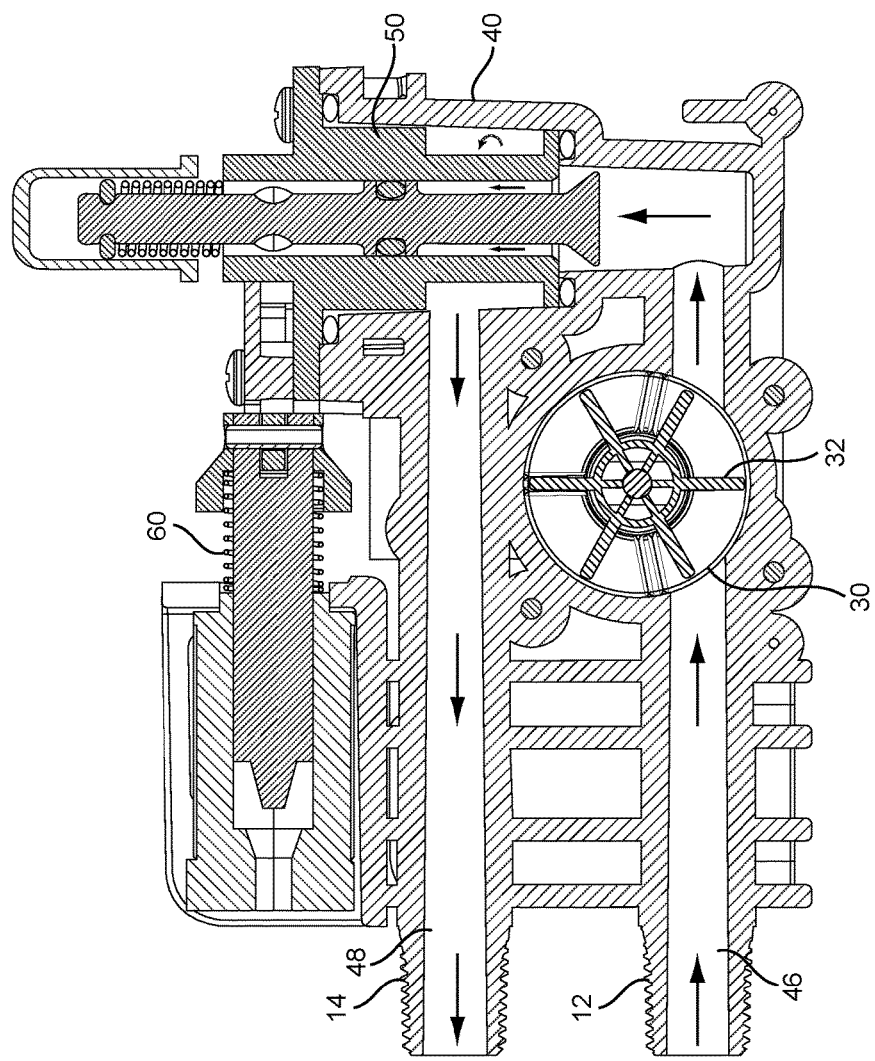
Figure 4:
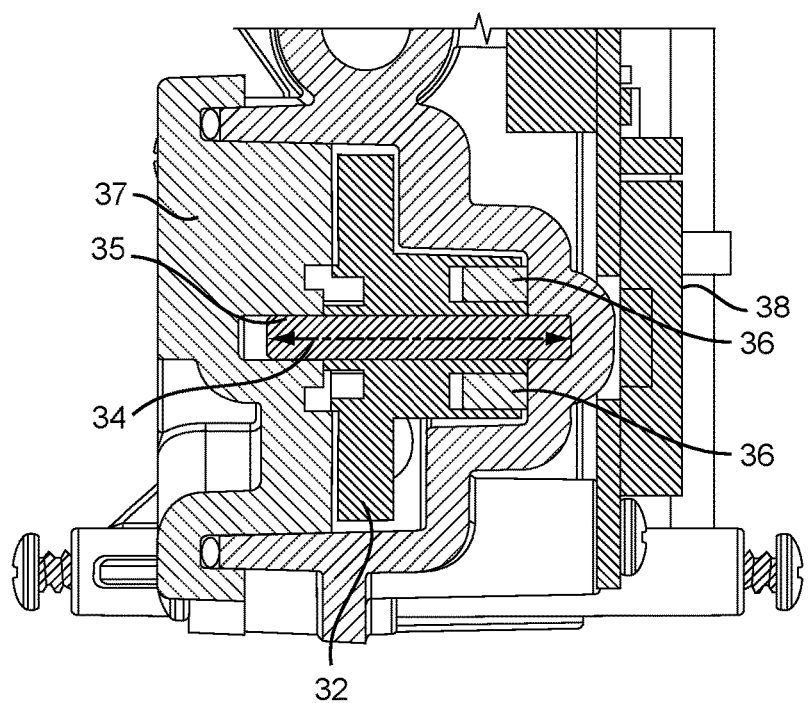

One embodiment of the flow sensing impeller 32 is shown in FIGS. 3-4. The flow sensing impeller 32 and the impeller stem 35 are positioned and retained by a cover plate 37. The impeller can house one or more magnets 36 that turn as the impeller rotates about its axis 34. The turning magnets 36 pass a magnetic sensor 38, such as a reed switch or a Hall effect sensor, that is positioned in suitable proximity to the rotating impeller 32. As magnets pass the magnetic sensor 38 pulse signals are generated and sent to the controller 20. In one embodiment, a pair of magnets 36 having opposite polarities are mounted on opposed sides of the impeller stem 35. As the turning magnets pass the magnetic sensor they open and close a switch to generate electronic pulses. The generated pulse signals can facilitate determination of the volume of water that has passed since the volume of flowing water needed to rotate the impeller is programmed into the controller. Thus, the flow sensor 30 translates volumetric water flow into electronic pulses.

Shut-off Assembly

The water flow control device 10 can include a shut-off assembly 40 for shutting off water flow. The shut-off assembly can include a valve 50 that is activated by a solenoid 60. The valve 50 can be any type of valve that has a first open position that allows water to flow through the valve and a second closed position that prevents water from flowing through the valve.

(a) Shut-Off Valve

Figure 5A:
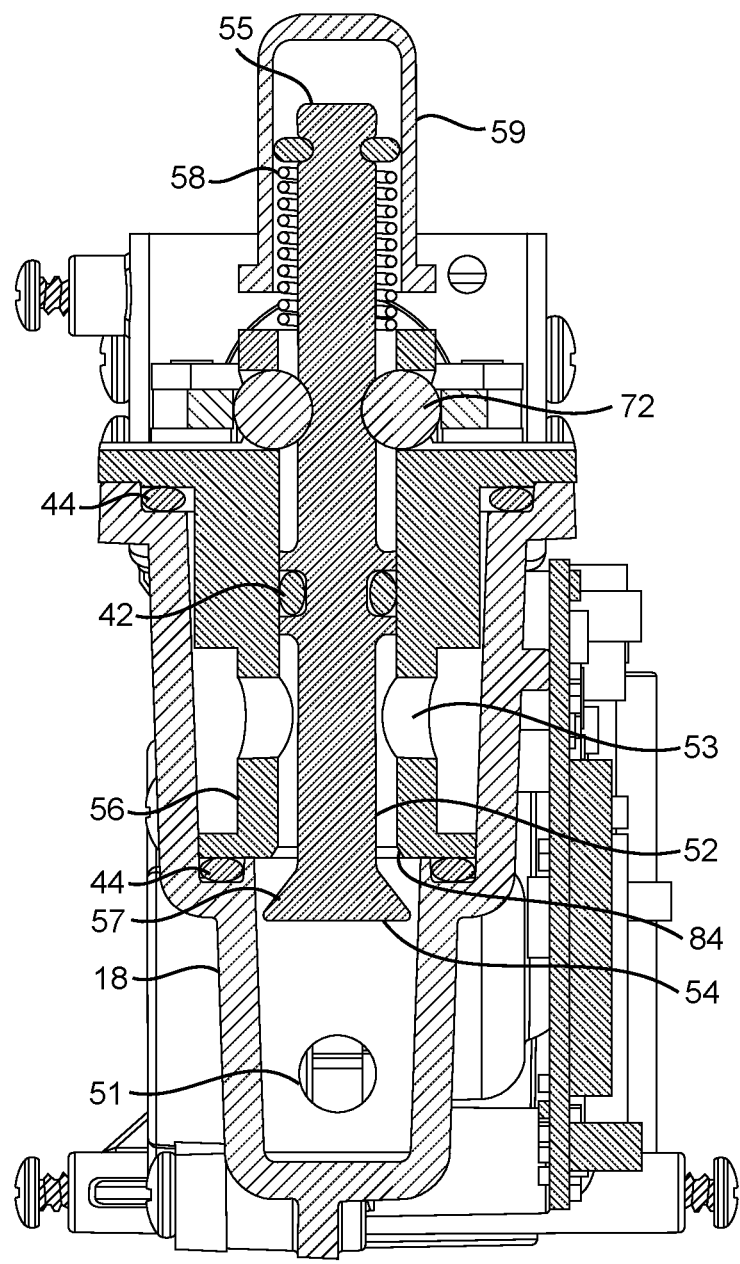
FIGS. 5A illustrates a cross sectional end view of a shut-off valve of the water flow control device in an open and locked position in accordance with an embodiment.
Figure 5B:
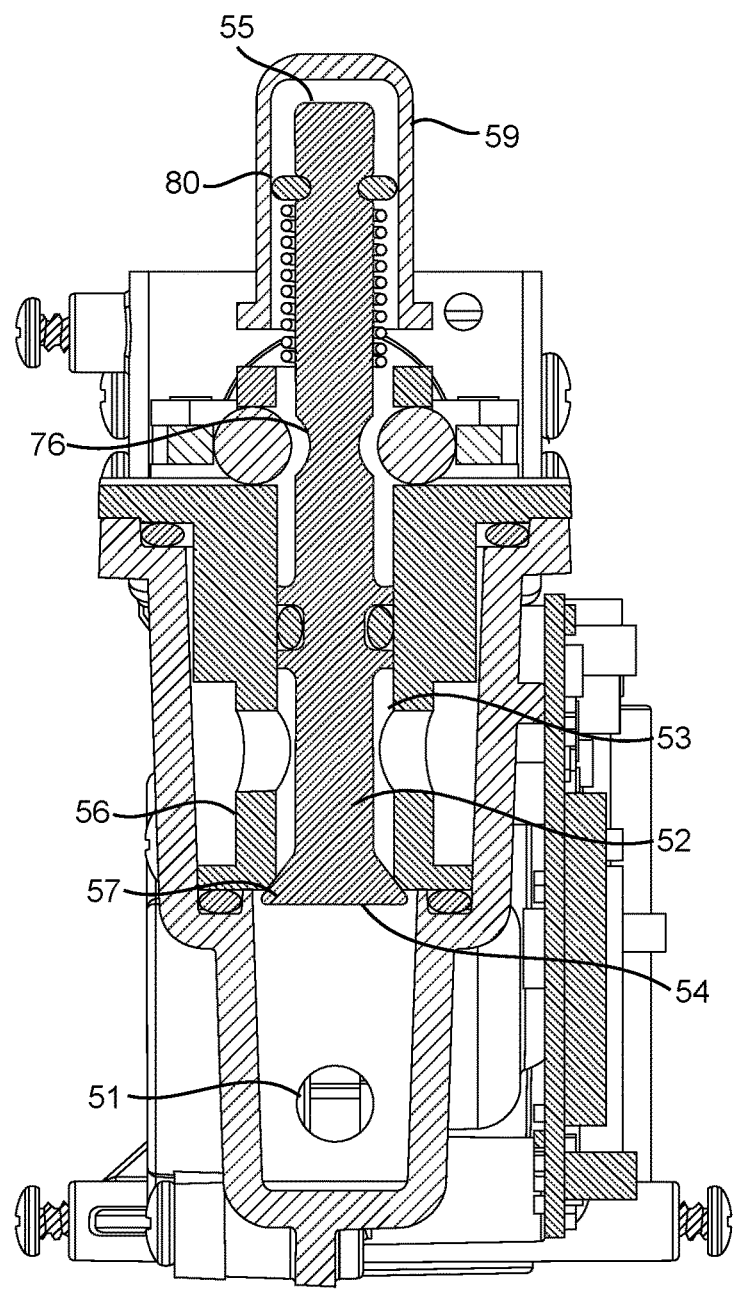
FIG. 5B illustrates a cross sectional end view of a shut-off valve of the water flow control device in an closed position in accordance with an embodiment.

One embodiment of the valve is shown in FIGS. 5A and 5B. The valve 50 utilizes a one piece valve body 18. The valve body 18 can be made of any suitable material, such as a plastic material or a noncorrosive metal. The valve body 18 serves to both encapsulate the inner workings of the valve 50 and to hold the various components contained therein, together and in place.

The valve 50 includes a valve cage 56 and a valve stem 52 enclosed within the valve body 18. The valve body 18 also includes a water intake area 51 that is in fluid communication with the inlet 12 and the valve stem 52 as described below. The valve cage 56 has an inner bore and a series of openings 53. The body of the valve stem 52 is vertically positioned within the valve cage 56 with its top end 55 protruding into a valve cap 59 and its bottom end 54 interfacing with the water intake area 51. The top end of the valve stem interfaces with valve cap 59 and a valve stem spring 58. Proximal the top of the valve cage where the valve stem exit the valve cage, the valve stem 52 has two arcuate indentions in the valve stem.

The valve cage 56 includes O-rings 44 to seal the valve cage 56 within the valve body 18 and O-rings 42 to seal the water flow path within the valve cage, forcing the flow of water from the water intake area 51, around the lower portion of the valve stem and out through cross holes or openings 53 to exit through the outlet 14. The valve stem O-rings 42 seal the water flow area of the valve cage and prevent the leakage of water up the stem and into the top end of the valve cage and valve cap.

When the valve 50 is in a first open position (as shown in FIGS. 3 and 5A), the distal or bottom end 54 of the valve stem 52 that is separated from a valve seat 84 at the bottom end of the valve cage 56 providing a flow path for water into the valve cage and out through openings 53. In this embodiment of the shut-off assembly 40, water flows from the inlet 12 to the outlet 14 following this flow path. When the solenoid is activated, it unlocks the valve stem and the valve is closed. The unlocked valve stem 52 moves up so that an integral shut-off collar 57 of the valve stem is seated against a valve seat 84 at the bottom of the valve cage 56 and shuts off the flow path for flowing water as shown in FIG. 5B.

(b) Valve Activation Solenoid Assembly

The illustrated embodiment of the valve 50 is activated to go from an open position to a closed position by a spring loaded, pull type solenoid assembly. Now referring to FIG. 6, the solenoid assembly 60 includes a solenoid shaft 62, a solenoid spring 63, a trigger cone 64, and a pair of retainer arms 66 that pivot about pins 67 to interact with a pair of retainer balls 72.

During normal use of the water control device 10, the valve 50 is locked in an open position. The solenoid assembly 60 typically includes a solenoid shaft 62 having an interior end secured to a trigger cone 64 and a solenoid spring 63 nested between the solenoid shaft 62 and the trigger cone 64. The trigger cone 64 can be positioned between the valve cage 56 and the solenoid shaft. The forward end of the trigger cone faces the valve cage and the back end of the cone has a flat bottomed bore where the solenoid shaft is secured to the trigger cone. The outward surface of the trigger cone is generally cylindrical with the forward zone 65 of the trigger cone having a larger diameter than the back zone 61 of the trigger zone, wherein the forward zone and the back zone are joined by an arcuate surface 69.

Figure 6:
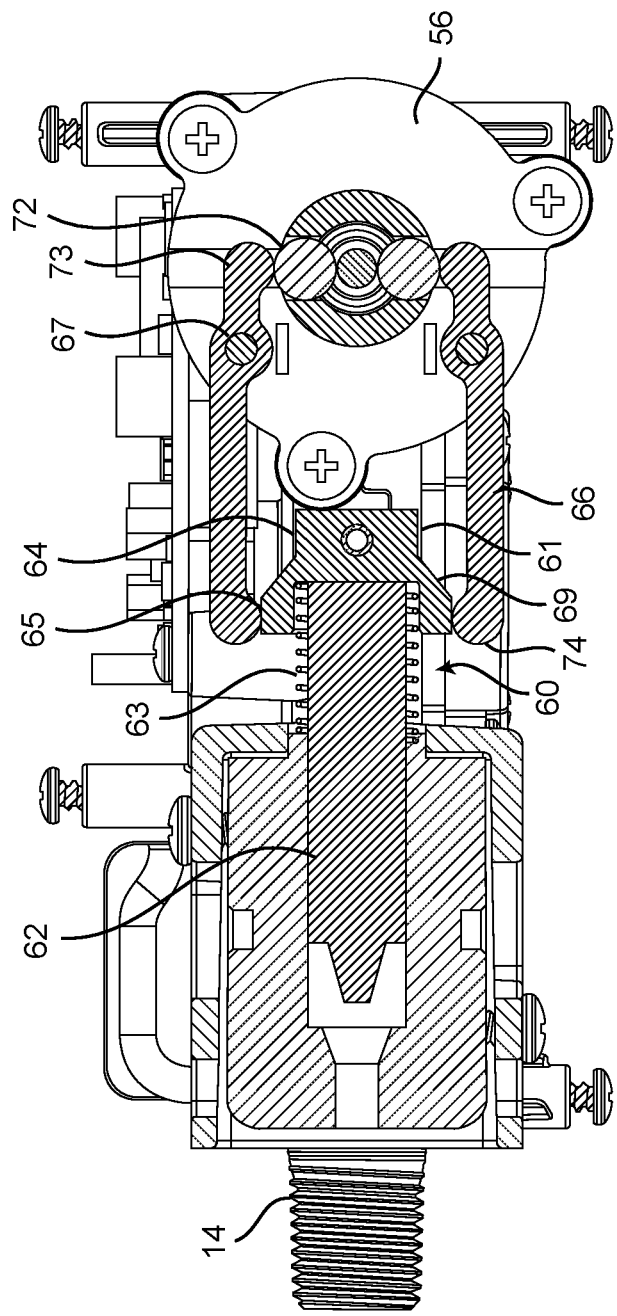

Under normal operating conditions, the valve is locked in the open position as seen in FIG. 5A and the solenoid assembly 60 is configured as illustrated in FIG. 6. The solenoid shaft 62 and the trigger cone 64 abut the top end of the valve cage 56. The two retainer arms 66 have a first arcuate end 74 that rests on the forward zone 65 of the trigger cone and a second arcuate end 73 that interacts with the retainer ball 72. The retainer arms 66 can pivot about a pair of opposed retainer pins 67. The second end 72 of the retainer arms 66 are biased against a pair of opposed retainer balls 72. The valve stem 52 is retained in its open position by this pair of retainer balls 72 nesting in radial undercuts 76 on the valve stem as seen in FIG. 5A. The retainer balls 72 can be made of stainless steel or another suitable material.

Upon activation, the solenoid shaft 62 is moved toward the outlet 14 thereby pulling the trigger cone 64 in a horizontal direction and compressing the solenoid spring 63. As the trigger cone 64 is pulled toward the outlet, the first arcuate end 74 of the retainer arm moves inward as it interacts with the arcuate surface 69 that joins the forward zone 65 and the back zone 61 of the trigger cone. The retainer arms pivot about pins 67, thus moving the second ends 73 outward away from the valve stem 52 to release their bias against the retainer balls 72. When the second end of the retainer arms 66 splay outward, the retainer balls 72 can be released.

Once the two retainer arms splay outward, the valve stem spring 58 lifts the valve stem 52 upward by means of spring retainer 80. During this upward motion, the radial geometry of the valve stem undercuts 76 and the release of pressure on the balls 72 result in a rejection action that forces the balls 72 outward releasing the valve stem 52 to move upward into the valve cap 59. When the valve stem 52 lifts to the shut-off position, the valve stem shut-off collar 57 interfaces with the valve seat 84 at the bottom end of the valve cage 56 to stop the flow of water as illustrated in FIG. 5B.

(c) Manual Reset of the Water Flow Control Device

Once the undesired water flow triggering event has been remedied, the water flow control device 10 can be reset and the valve once again locked in its open position. The water flow control device operator can manually reset the water flow control device by manually depressing the valve cap, which is generally made of an elastomeric material, to push the valve stem downward until the radial valve stem undercuts 76 are in line with the retainer balls 72 which can then enter into the radial undercuts 76 in the valve stem. Whenever the valve is in its closed position, the compressed solenoid spring 63 on the solenoid shaft 62 maintains sufficient pressure on the trigger cone 64 to allow it to return to its extended position once the retainer balls are in line and interface with the radial undercuts 76. Once the trigger cone 64 has been re-extended the second end 73 of the retainer arms 66 will again interact with the balls 72 and force them to return to their radial undercuts 76. This consequently restricts the valve stem 52 movement and locks the valve stem 52 in the open position to allow the water to flow unobstructed.

Controller

The water flow control device 10 includes a controller 20. The controller can comprise a printed circuit board controller 20 and computer program instructions that captures the electronic pulses generated by the flow sensor 30 and applies an algorithm to interpret the pulses into flow characteristics.

Preferred embodiments of the water flow control device 10 is installed to communicate with a specific commode, the commode is flushed a number of times and the controller measures and collects data on the specific time and water volume that it takes for the toilet to fill and the number of rotations or pulses generated during different flush cycles. The data can then be processed by the controller to determine set limits for various variables of water flow characteristics to the commode. These calculated water flow and time limits can be stored in the non-volatile memory of the controller to serve as predetermined limits to certain water flow characteristics that serve as a threshold for closing the shut-off valve.

One or more algorithms stored in the non-volatile memory of the controller can be applied to derive a variety of flow characteristics from the pulses generated by the flow sensor. The controller processes this information to determine if a leak is present. For example, the controller 20 is programmed to recognize standard normal, partial and extended flow rates, set a limit on water flow as detected from a flow sensor in a given amount of time. If the controller determines that the water volume limit, maximum period of time for continuous water flow, maximum pulses within a set period of time or any other predetermined/stored limitations of the commode water flow characteristics fall outside of the predetermined limits, the controller will send a signal to activate the water shut-off assembly and close the shut-off valve.

The controller 20 can be powered by any type of power supply. For example, a small, replaceable standard consumer battery may be used as power supply. The controller 20 can be configured such that miniscule amounts of energy are needed to check if water is flowing and record water flow so that battery life can be substantial.

The controller 20 can be calibrated to measure and evaluate the output and measurement of water flow from the water sensor with the amount of water volume (for example, gallon/liter of water) to determine the volume of water. This is different from conventional valves that typically initiate a timer to regulate the maximum amount of water allowed to pass once water flow is detected. Because water flow through a particular commode is measured in the present invention, the water flow control device 10 can collect and store information for partial fill events. Thus, providing a more accurate assessment of leakage can be accomplished.

Operation of Device

During use, as shown in FIG. 3, water enters the inlet 12 and flows through an inflow water flow passage 46, at which time it engages with and rotates the flow sensing impeller 32. The water continues to flow through passage 46 into a lower part of valve body 18 where the water passes over and around the shut-off collar 57 and valve stem 52 to enter the inner bore of the valve cage 56. The water can then flow out through a series of cross holes 53 in the valve cage 56 and through an outflow water flow passage 48 to exit the water flow control device 10 through the outlet 14.

Since water first flows past the flow sensing impeller 32, if a leak occurs in the water flow control device downstream from the inlet 12, such as by blowing a seal, the flow sensing impeller 32 can immediately begin measuring such water flow and subsequently trigger the water flow control device 10 to stop the water flow. Thus, shut-off can be achieved even if there is a mechanical failure in the water flow control device 10 itself, unlike conventional commode valves.

The water flow control device 10 can monitor and control the flow of water based on a predetermined pulse count directly calibrated to a specific volume of water. For exceptionally small but long term continuous leaks, the controller 20 can default to a preset maximum time mode and shut down the water flow.

When water starts to flow, the controller 20 can acknowledge continuous pulse signals from the flow sensing impeller 32. The amount of water can be measured by counting pulses or rotations of the flow sensing impeller 32. The controller 20 can be programmed to determine standard normal, partial and extended flow rates, set a limit on impeller rotations or pulses in a given amount of time, and to close the water flow control device 10 if the maximum water volume limit, maximum period of pulse feedback, or set number of pulses, is exceeded.

For example, if the water flows longer than the calculated number of pulses that the commode normally takes to fill, at a lower flow rate and pulse count than expected, the controller 20 can send a signal to the valve activation solenoid assembly 60. This is a continuous, trickle leak scenario. The solenoid 60 can activate the shut-off assembly 40 and the spring-loaded valve stem 52 can close.

The measurement of water as determined by calibrated pulse feedback and collection, directly driven by flow rate, permits the water flow control device 10 to more accurately detect a variety of leak scenarios, shut-off water flow, and reduce wasted water and potential flooding. When the water starts to flow, for instance, when a commode is flushed, the controller 20 can acknowledge continuous pulse signals from the flow sensing impeller 32 and the circuitry starts counting the number of pulses and duration. If the flow stops at, or before the preset limits, the controller 20 resets to standby status. In the event of a low pressure, continuous trickle leak, a background, secondary timed circuit (not shown) programmed into the controller can send a signal to the solenoid 60 to stop water flow regardless of the volume detected. The controller 20 can also be configured to recognize flow signals shorter than the normal cycle duration. After collecting a predetermined number of these shorter signals, over a predetermined period of time, the controller can activate the solenoid 60 and shut-off the water.

When activated, the solenoid 60 can retract the trigger cone 64 from between the two retainer arms 66. The valve stem spring 58 lifts the valve stem 52 upward by means of a spring retainer 80. During this upward motion, the radial geometry of the stem undercuts 76 and the balls 72 result in a rejection action that forces the balls 72 outward away from the undercuts. The solenoid shaft 62 compresses spring 63 when it retracts. When the valve stem 52 lifts to the shutoff position, the conical shut-off collar 57 can seat against a valve seat 84 at the bottom end of the inner valve cage bore and stop the flow of water.

Once the undesired water flow triggering event has been remedied, the water flow control device 10 can be reset manually, and the valve once again locked in its open position. The water flow control device operator can manually reset the water flow control device by manually depressing the valve cap, which is generally made of an elastomeric material, to push the valve stem downward until the radial valve stem undercuts 76 are in line with the retainer balls 72 which can then enter into the radial undercuts 76 in the valve stem. Whenever the valve is in its closed position, the compressed solenoid spring 63 pushes the trigger cone 64 back to return to its extended position once the retainer balls are in line and can interface with the radial undercuts 76. Once the trigger cone 64 has been re-extended the second end 73 of the retainer arms 66 will again interact with the balls 72 and force them to return to their radial undercuts 76.

This consequently restricts the valve stem 52 movement and locks the valve stem 52 in the open position to allow the water to flow unobstructed.

The water flow control device 10 can detect water flow at the supply line and does not wait for a flood to occur before it activates and shuts off the water supply. This contrasts with the current industry norm where water wasted due to leaky, stuck, or defective flappers or fill valves inside of a commode goes undetected due to the measurement of flow rate.

The water flow control device, in accordance with the embodiments discussed herein, recognizes and learns normal commode activity and does not interfere with the water flow. If, for some reason, the flow continues past the normal fill cycle, the water supply will shut down. Typically, in the event of a sticky flapper valve, a considerable amount of water is wasted. The water flow control device of this invention, advantageously, can greatly reduce such water waste. In the event of a leaky flapper valve, the intermittent tank fill events will alert the valve and shutoff the water, forcing the homeowner or operator to manually reset the valve. Applicant envisions that the inconvenience of a manual reset will lead to the operator repairing the flapper and stopping the water waste. Since the water flow control device can recognize excessively long, low pressure and full pressure fill events, it can also activate in the event of a compromised fill valve, flood or operator absence if the commode were to become obstructed and the fill valve would continue to provide water.

The water flow control device can be installed inline, between the wall mounted incoming commode supply valve and the commode supply line. The water flow control device can connect directly to the output side of the commode supply valve and accept the hose coming from the commode tank. In practice, the commode supply line can be disconnected from the wall supply valve, the water flow control device can be attached directly to the wall supply valve, and the commode supply line can be reconnected to the water flow control device.

The foregoing provides a detailed description of the invention which forms the subject of the claims of the invention. It should be appreciated that further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A water flow control device having:
   (a) a water inlet;
   (b) a flow sensor assembly in fluid communication with the inlet, wherein the flow sensor assembly includes a flow sensing impeller;
   (c) a shut-off assembly located downstream of and in fluid communication with the flow sensor assembly, wherein the shut-off assembly includes
      (i) a shut-off valve, and
      (ii) a valve activation solenoid assembly, wherein the valve activation solenoid assembly comprises:
         a solenoid shaft,
         a solenoid spring,
         a trigger cone, and
         a pair of retainer arms that pivot between a first position and a second position about pivot pins, wherein when the retainer arms are in the first position each retainer arm biases a surface of a retainer ball thereby forcing the retainer ball to interface with a radial undercut of a value stem and when the retainer arms are in the second position each retainer arm moves away from the valve stem releasing the interaction of the retainer ball and the radial undercut of the valve stem;
   (d) a controller configured to receive input from the flow sensor assembly, determine if the received input falls within predetermined flow characteristic limits, and to send a signal to the shut-off assembly whenever the received input falls outside of the predetermined limits; and
   (e) a water outlet, wherein the outlet is located downstream of and in fluid communication with the shut-off assembly.

2. The water flow control device according to claim 1, wherein the flow sensor assembly includes:
   the flow sensing impeller that rotates as flowing water passes through the flow sensor assembly;
   one or more magnets housed within the flow sensing impeller; and
   a magnetic sensor, wherein when the magnets pass the magnetic sensor a pulse is generated and sent to the controller.

3. The water flow control device according to claim 1, wherein the controller is configured to continually receive the pulses from the flow sensor assembly and to activate the shut-off assembly if a number of pulses exceeds a set count and/or if the pulses continue beyond a set period of time.

4. The water flow control device according to claim 1, wherein the solenoid shaft is attached to the trigger cone, wherein the trigger cone engages with the retainer arms, and wherein the trigger cone retracts and pivots the retainer arms from the first position to the second position when the solenoid is activated by the controller.

5. The water flow control device according to claim 4, wherein the trigger cone has a forward zone that has a larger diameter than a back zone whereby each retainer arm pivots between the first and second position as the trigger cone retracts and a first end of the retainer arm shifts its interaction from the forward zone to the back zone.

6. The water flow control device according to claim 1, wherein the shut-off valve is retained in an open position by the retainer balls interacting with the undercuts of a valve stem.

7. The water flow control device according to claim 1, wherein when the retainer arms are in the second position the interaction of the retainer balls and the radial undercuts of the valve stem is released and the valve stem is pulled upward to close the valve.

8. The water flow control device according to claim 1, wherein when the retainer arms are in the second position the shut-off valve is closed.

9. A method of controlling water flow, comprising:
   installing the water flow control device according to claim 5 between a water supply and a toilet;
   monitoring the pulses from the flow sensor assembly; and recording the number of monitored pulses into the controller.

10. The method according to claim 9, further comprising pre-calibrating a total number of pulses to a specific volume of water.

11. The method according to claim 10, further comprising determining an actual volume of water flow from the calculated number of monitored pulses.

12. The method according to claim 9, wherein the controller programmatically determines normal, partial and extended water flow rates.

13. The method according to claim 12, wherein the controller is configured to set a limit on the number of pulses in a given amount of time.

14. The method according to claim 13, wherein the controller transmits a signal to the solenoid to activate the shut-off assembly.

15. The method according to claim 14, wherein the shut-off assembly closes the water flow control device if a predetermined maximum water volume limit, maximum period of pulse feedback, or number of pulses, is exceeded.

16. The method according to claim 14, wherein the activated solenoid causes the trigger cone to retract from between the retainer arms forcing the retainer balls outward.

* * * * *